(12) United States Patent
Han et al.

(10) Patent No.: US 11,602,926 B2
(45) Date of Patent: Mar. 14, 2023

(54) BIAXIAL ORIENTED POLYESTER REFLECTION FILM AND MANUFACTURING METHOD THEREOF

(71) Applicant: TORAY ADVANCED MATERIALS KOREA INC., Gumi-si (KR)

(72) Inventors: Seung Hun Han, Gumi-si (KR); Kil Joong Kim, Gumi-si (KR); Gi Jeong Moon, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 10 days.

(21) Appl. No.: 17/057,328

(22) PCT Filed: Oct. 2, 2018

(86) PCT No.: PCT/KR2018/011680
§ 371 (c)(1),
(2) Date: Nov. 20, 2020

(87) PCT Pub. No.: WO2019/235693
PCT Pub. Date: Dec. 12, 2019

(65) Prior Publication Data
US 2021/0187924 A1      Jun. 24, 2021

(30) Foreign Application Priority Data

Jun. 7, 2018 (KR) .................. 10-2018-0065341

(51) Int. Cl.
| | | |
|---|---|---|
| *B32B 27/36* | (2006.01) | |
| *B29D 7/01* | (2006.01) | |
| *B29D 11/00* | (2006.01) | |
| *B32B 3/12* | (2006.01) | |
| *B32B 27/08* | (2006.01) | |

(Continued)

(52) U.S. Cl.
CPC ............... *B32B 27/36* (2013.01); *B29D 7/01* (2013.01); *B29D 11/00788* (2013.01);
(Continued)

(58) Field of Classification Search
CPC ......... B32B 27/36; B32B 27/08; B32B 27/20; B32B 3/12; B32B 2250/244;
(Continued)

(56) References Cited

U.S. PATENT DOCUMENTS

2005/0185416 A1*  8/2005  Lee ..................... F21V 7/0091
                                          362/551
2007/0047261 A1*  3/2007  Thompson ........... G02B 6/0028
                                          362/623
(Continued)

FOREIGN PATENT DOCUMENTS

CN      101910881 A      12/2010
JP      2006330057 A  *  12/2006
(Continued)

OTHER PUBLICATIONS

IP.com translation of JP-2008309975-A (Year: 2021).*
(Continued)

*Primary Examiner* — Michael Zhang
(74) *Attorney, Agent, or Firm* — NSIP Law (57) ABSTRACT

A biaxially oriented polyester reflection film according to an embodiment of the present invention includes: a core layer having a plurality of voids, and containing homo-polyester, copolymer polyester, a resin incompatible with polyester, and inorganic particles; and a skin layer formed at least one surface of the core layer, and containing homo-polyester, copolymer polyester, and inorganic particles, wherein the biaxially oriented polyester reflection film is formed to have a plurality of light focusing structures, each of which has a concave center portion, and which are arranged in a grid pattern.

17 Claims, 2 Drawing Sheets

(51) Int. Cl.
  *B32B 27/20* (2006.01)
  *C08L 67/02* (2006.01)
  *G02B 5/08* (2006.01)
  *B29K 67/00* (2006.01)
  *B29K 509/08* (2006.01)
(52) U.S. Cl.
  CPC ............... *B32B 3/12* (2013.01); *B32B 27/08* (2013.01); *B32B 27/20* (2013.01); *C08L 67/02* (2013.01); *G02B 5/0808* (2013.01); *B29K 2067/003* (2013.01); *B29K 2509/08* (2013.01); *B29K 2995/003* (2013.01); *B29K 2995/0053* (2013.01); *B32B 2250/03* (2013.01); *B32B 2250/244* (2013.01); *B32B 2250/40* (2013.01); *B32B 2264/104* (2013.01); *B32B 2264/1021* (2020.08); *B32B 2270/00* (2013.01); *B32B 2307/518* (2013.01)
(58) Field of Classification Search
  CPC ........ B32B 2250/40; B32B 2264/1021; B32B 2264/104; B32B 2270/00; B32B 2307/518; B29L 2011/0083
  See application file for complete search history.

(56) References Cited

U.S. PATENT DOCUMENTS

| 2010/0285302 | A1* | 11/2010 | Yoshida | B32B 27/36 428/317.9 |
|---|---|---|---|---|
| 2011/0292655 | A1 | 12/2011 | Ing et al. | |

FOREIGN PATENT DOCUMENTS

| JP | 2008-309975 | A | | 12/2008 |
|---|---|---|---|---|
| JP | 2008309975 | A | * | 12/2008 |
| JP | 2009-289687 | A | | 12/2009 |
| JP | 2012-212049 | A | | 11/2012 |
| KR | 2001-0095197 | A | | 11/2001 |
| KR | 10-2009-0066094 | A | | 6/2009 |
| KR | 10-2012-0021814 | A | | 3/2012 |
| KR | 10-2012-0044957 | A | | 5/2012 |
| KR | 10-2012-0072484 | A | | 7/2012 |
| KR | 10-1218145 | B1 | | 1/2013 |
| KR | 10-2014-0023473 | A | | 2/2014 |
| TW | 201142368 | A1 | | 12/2011 |

OTHER PUBLICATIONS

Espacenet Translation of JP 2008-309975 (Year: 2022).*
ip.com translation of JP2006330057A (Year: 2022).*
Notice of Reasons for Rejection dated Dec. 21, 2021, in counterpart Japanese Patent Application No. 2020-566654 (7 pages in Japanese).
International Search Report dated Mar. 5, 2019 in counterpart International Patent Application No. PCT/KR2018/011680 (2 pages in English and 2 pages in Korean).
Chinese Office Action dated May 6, 2022 in corresponding Chinese Patent Application No. 201880094253.6 (8 pages in English, 6 pages in Chinese).

* cited by examiner

BIAXIAL ORIENTED POLYESTER REFLECTION FILM AND MANUFACTURING METHOD THEREOF

CROSS REFERENCE TO RELATED APPLICATIONS

This application is a U.S. National Stage Application of International Application No. PCT/KR2018/011680, filed on Oct. 2, 2018, which claims the benefit under 35 USC 119(a) and 365(b) of Korean Patent Application No. 10-2018-0065341, filed on Jun. 7, 2018, in the Korean Intellectual Property Office, the entire disclosures of which are incorporated herein by reference for all purposes.

TECHNICAL FIELD

The following description relates to a reflection film for use in a local dimming liquid crystal display, and more particularly to a polyester reflection film, in which by improving formability and dimensional stability, the polyester reflection film may maintain excellent dimensional stability and reflective properties even after vacuum pressure forming and hot-press forming.

BACKGROUND ART

Recently, liquid crystal displays (LCDs) are used in a wide range of applications including a mobile device, a tablet PC, a monitor, a laptop computer, TV, and the like. The LCD is not a spontaneous light emitting device, such that a backlight unit, which provides light from a rear surface of a light crystal screen, is required. As a light source of the backlight unit, a linear light source using a Cold Cathode Fluorescent Lamp (CCFL) was generally used, but recently, a point light source is widely used. In order to use the point light source or the linear light source of the backlight unit as a display, it is required to convert the light sources into a surface light source. To this end, the backlight unit includes, in addition to a light source, various optical sheets having a light guide panel which transmits LED light, emitted from the side, to the front; a reflection film which reflects light back to the front when light is lost to the back of a display; a diffusion film which uniformly diffuses light to be emitted to the front; a prism film which focuses the diffused light onto the front, and the like, so as to convert the point light source into the surface light source. The LCD using the surface light source after conversion by the backlight unit includes a polarizing film, a thin film transistor (TFT), a liquid crystal, a color filter, and the like in a display panel, so as to implement R, G, and B colors in units of pixels. The LCD provides a contrast ratio between brightness and darkness by applying a voltage to the panel and by blocking or transmitting light by arranging liquid crystals. However, the LCD has a problem in that the contrast ratio between colors is very low, compared to an OLED which is a spontaneous light emitting device with each pixel spontaneously emitting light.

Accordingly, the industry has developed methods to improve the contrast ratio by using a local dimming method for turning ON/OFF each point light source by using a plurality of LEDs. In the case of driving a plurality of LEDs separately, in order to reduce light interference between LED devices, a method of repeatedly forming concave portions and holes in a reflection film, and mounting LEDs therein has been suggested. However, when forming the reflection film by heating at high temperature, there are problems in that the existing reflection film may not be formed in a desired shape; voids in the reflection film may be deformed during forming, such that reflective properties may be significantly degraded; or the mounted LEDs may be separated due to a dimensional change. Thus, there is a need for a reflection film having excellent forming properties, dimensional stability after forming, and maintaining reflective properties.

Korean laid-open patent publication No. 10-2001-0095197 discloses a reflection film using a polyester-based resin as a principal raw material, in which reflective properties of the film are enhanced by improving processability using a contained void-forming agent having an optimal melt viscosity. However, the reflection film only improves general melt viscosity, and thus cannot solve the above problems such as deformation of voids during forming.

PRIOR ART DOCUMENT

Patent Document (Patent document 0001) Korean Laid-open Patent Publication No. 10-2001-0095197

DISCLOSURE

Technical Problem

The present invention has been made to solve the above problems, and it is an object of the present invention to provide a reflection fil having excellent dimensional stability and optical characteristics, by improving formability of the reflection film by reforming polymer, designing an optimal layer structure, and using a film producing technique for relaxation, and optimizing a composition of materials contained in the film and mixing proportions by volume.

The above and other objects and advantages of the invention will become apparent from the following detailed description of preferred embodiments.

Technical Solution

In accordance with one aspect of the present invention, the above object is accomplished by providing a biaxially oriented polyester reflection film, including: a core layer having a plurality of voids, and containing homo-polyester, copolymer polyester, a resin incompatible with polyester, and inorganic particles; and a skin layer formed at least one surface of the core layer, and containing homo-polyester, copolymer polyester, and inorganic particles, wherein the biaxially oriented polyester reflection film is formed to have a plurality of light focusing structures, each of which has a concave center portion, and which are arranged in a grid pattern.

A hole may be preferably disposed at the concave center portion of each of the plurality of light focusing structures.

A thickness of the skin layer may be preferably greater than 1.0% to less than 10.0% of a thickness of the core layer.

A size of the inorganic particles of the core layer may be preferably greater than 0.01 um to less than 2.0 um.

A size of the inorganic particles of the skin layer may be preferably greater than 0.1 um to less than 10.0 um.

The core layer may preferably satisfy an equation $$0.05 \leq \frac{V_d}{(Va + Vb) - Vc} \leq 0.2,$$

wherein Va may denote a percentage by volume of the homo-polyester, Vb may denote a percentage by volume of the copolymer polyester, Vc may denote a percentage by volume of the incompatible resin, and Vd may denote a percentage by volume of the inorganic particles.

A content of the incompatible resin may be preferably in a range of from 5.0% by volume to 20.0% by volume, and a content of the copolymer polyester may be preferably in a range of from 5.0% by volume to 30.0% by volume.

The skin layer may preferably contain the homo-polyester in a range of greater than 60% by weight to less than 94.9% by weight, copolymer polyester in a range of greater than 5.0% by weight to less than 30.0% by weight, and the inorganic particles in a range of greater than 0.1% by weight to less than 10.0% by weight.

The biaxially oriented polyester reflection film may preferably satisfy an equation $$\frac{WA_r - WA_m}{WA_r} \times 100\% \leq 5\%,$$

wherein $WA_m$ may denote an interior angle of a forming mold used to form the biaxially oriented polyester reflection film in the grid pattern, and $WA_r$ may denote an interior angle between a virtual line, which connects a convex portion of the biaxially oriented polyester reflection film and a contact point between the biaxially oriented polyester reflection film and the forming mold, and a concave portion of the biaxially oriented polyester reflection film.

The biaxially oriented polyester reflection film may have a spectral reflectivity of preferably 95% or higher at a wavelength of 450 nm, and a change in the spectral reflectivity of the biaxially oriented polyester reflection film may be preferably equal to or less than 5.0% at the wavelength of 450 nm before and after forming performed using the forming mold.

A thickness of the biaxially oriented polyester reflection film may be preferably in a range of 150 um to 400 um.

A specific gravity of the biaxially oriented polyester reflection film may be preferably in a range of 0.7 g/cm$^3$ to 1.2 g/cm$^3$.

A dimensional change rate of the biaxially oriented polyester reflection film may be preferably less than or equal to 5% after being left for 500 hours under constant temperature at 60° C. and constant humidity at 90%.

The resin incompatible with the homo-polyester may be preferably at least one selected from a crystalline polyolefin resin, a non-crystalline cyclic polyolefin resin, a polystyrene resin, a polyacrylate resin, a polycarbonate resin, a polyacrylonitrile resin, a polyphenylene sulfide resin, and a fluorine-based resin, or a homo-polymer or a copolymer thereof.

The inorganic particles may be preferably one or more selected from a group consisting of silica, alumina, barium sulfate, titanium dioxide, and calcium carbonate.

In accordance with another aspect of the present invention, the above object is also accomplished by providing a method of producing a biaxially oriented polyester reflection film, the method including: a first step of drying raw materials of a core layer and a skin layer under vacuum; a second step of preparing a non-stretched sheet by using the raw materials of the core layer and the skin layer which are dried in the first step, to form the skin layer at least one surface of the core layer; a third step of producing a uniaxially stretched film by stretching the non-stretched sheet, prepared in the second step, in a longitudinal direction; a fourth step of producing a biaxially stretched film by re-stretching the uniaxially stretched film, prepared in the third step, in a transverse direction; a fifth step of performing heat-treatment of the reflection film produced in the fourth step; a sixth step of cooling the reflection film heat-treated in the fifth step; a seventh step of forming the reflection film, produced in the sixth step, using a forming mold, to form the reflection film to have a plurality of light focusing structures, each of which has a concave center portion and which are arranged in a grid pattern; and an eighth step of forming (punching) a hole for mounting an LED in the concave light focusing structures of the reflection film produced in the seventh step.

The fifth step may be preferably performed using a plurality of heat-treatment zones while increasing temperature from a starting zone to an ending zone in a stepwise manner, wherein a temperature difference between the starting zone and the ending zone of the heat-treatment may be in a range of 30° C. to 100° C.

Advantageous Effects

As described above, in the biaxially oriented polyester reflection film and the method of producing the same according to an embodiment of the present invention, the reflection film may have improved formability and dimensional stability and may maintain excellent reflective properties even before and after forming, such that the reflection film may be used as a reflection film for the local dimming LCD display.

However, the effects of the present invention are not limited to the aforesaid, and other objects not described herein will be clearly understood by those skilled in the art from the following description.

BEST MODE FOR CARRYING OUT THE INVENTION

Hereinafter, the configuration and effects of the present invention will be described in further detail with reference to Examples and the accompanying drawings. However, it should be understood that these examples are provided for more specific illustration of the present invention and are not to be construed as limiting the scope of the present invention.

In the drawings, the thickness of layers, regions, and the like, may be exaggerated for clarity. Like reference numerals generally designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all technical and scientific terms used herein have the same meanings as commonly understood by one of ordinary skill in the art to which this invention belongs. In case of conflict, the present specification, including any definitions herein, will control. Although any methods and materials similar or equivalent to those described herein can be used in the practice or testing of embodiments of the present invention, preferred methods and materials are described herein.

Figure 1A:
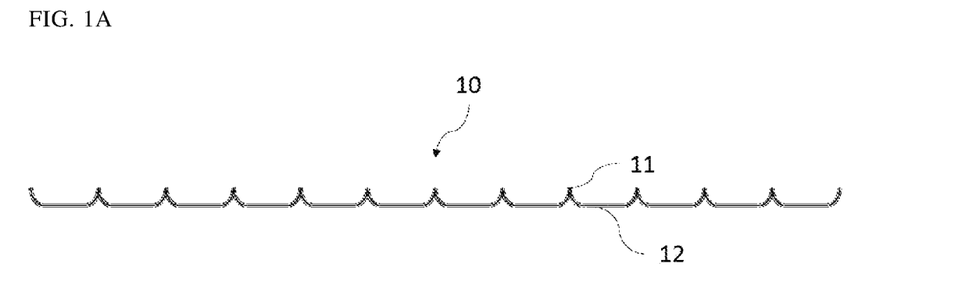
FIG. 1A is a cross-sectional diagram of a biaxially oriented polyester reflection film according to an embodiment of the present invention.

FIG. 1A is a cross-sectional diagram of a biaxially oriented polyester reflection film according to an embodiment of the present invention.

Figure 1B:
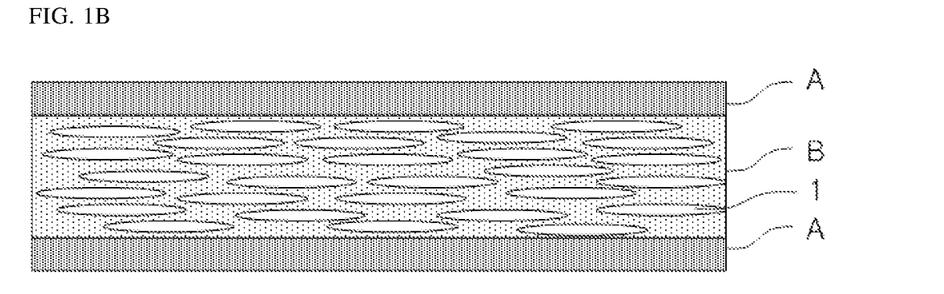
FIG. 1B is an enlarged cross-sectional diagram of a biaxially oriented polyester reflection film according to an embodiment of the present invention.

FIG. 1B is an enlarged cross-sectional diagram of a biaxially oriented polyester reflection film according to an embodiment of the present invention.

Figure 2:
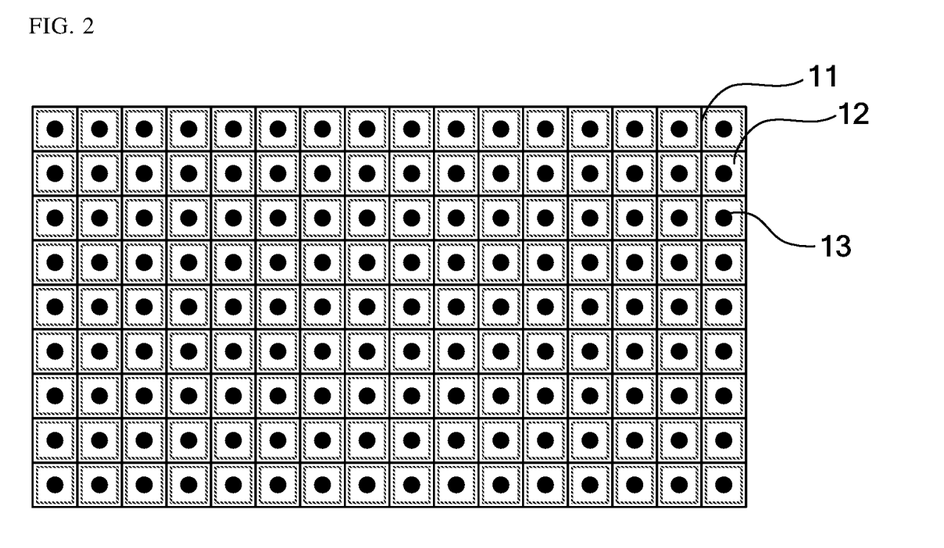
FIG. 2 is a plan diagram of a biaxially oriented polyester reflection film according to an embodiment of the present invention.

FIG. 2 is a plan diagram of a biaxially oriented polyester reflection film according to an embodiment of the present invention.

Figure 3:
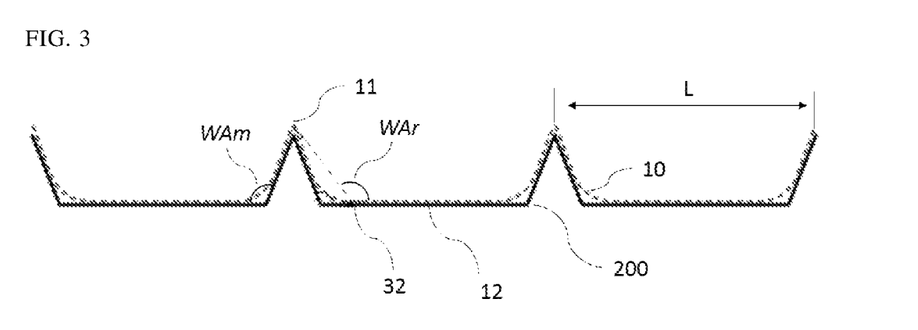
FIG. 3 is a diagram explaining a forming process of a biaxially oriented polyester reflection film according to an embodiment of the present invention.

FIG. 3 is a diagram explaining a forming process of a biaxially oriented polyester reflection film according to an embodiment of the present invention.

Referring to FIGS. 1A to 3, the biaxially oriented polyester reflection film 10 according an embodiment of the present invention has a two-layer structure including: a core layer B containing voids 1; and a skin layer A formed at least one surface of the core layer B. The biaxially oriented polyester reflection film 10 has the following configuration and composition of raw materials.

As illustrated in FIGS. 1A and 2, the core layer B of the biaxially oriented polyester reflection film 10 includes: a plurality of concave light focusing structures in a 凹-shape, each of which has a concave center portion 12, and which are arranged in a grid pattern; and a hole 13 formed at the concave center portion 12. According to the grid arrangement of the concave light focusing structures, a convex portion 11 and the concave portion 12 are repeatedly formed in the reflection film. As the biaxially oriented polyester reflection film 10 according an embodiment of the present invention has the concave light focusing structures, reflected light may be focused onto the center thereof without being scattered in all directions, thereby minimizing the effect of the reflected light of a bright region on a dark region, and enabling local dimming of each LED. While FIG. 2 illustrates a concave light focusing structure of a square shape, this is merely exemplary, and the grid shape is not limited to a square shape, but may have various shapes such as a circular shape, an oval shape, and a cubic shape.

The biaxially oriented polyester reflection film 10 according to an embodiment of the present invention may be produced in a two-layer structure A-B including a skin layer A and a core layer B, in which the skin layer A is formed only on one surface of the core layer B. Further, the biaxially oriented polyester reflection film 10 according to an embodiment of the present disclosure may be produced in a three-layer structure A-B-A including a skin layer A, a core layer B, and a skin layer A, in which the skin layer A is formed on both surfaces of the core layer B. For example, the three-layer structure A-B-A is further preferable in terms of film producing stability, defect control, and process stability. In the case where the film is produced in the two-layer structure A-B, the skin layer A, which serves as a support layer, is formed only on one side of the film, such that processing defects such as tearing of a film occur due to the lack of a support layer, thereby reducing productivity. Further, the core layer B, containing the voids 1, is formed on a surface layer of the other side of the film, such that the voids 1 are highly likely to cause appearance defects of a crater shape on the surface layer. In addition, in a secondary process such as beads coating and the like, the voids 1 may cause defects by scratching or pressing the surface of the reflection film. Furthermore, even when the reflection film is inserted into a backlight unit, the voids 1 may cause defects on a contact surface with a light guide panel by scratching or pressing the surface of the reflection film. Accordingly, the biaxially oriented polyester reflection film 10 according to an embodiment of the present disclosure is preferably formed in a three-layer structure A-B-A including the skin layer A, the core layer B, and the skin layer A. FIG. 1B illustrates the biaxially oriented polyester reflection film 10 formed in the three-layer structure A-B-A including the skin layer A, the core layer B, and the skin layer A.

A thickness of the skin layer A is preferably greater than 1.0% to less than 10.0% of a thickness of the core layer B. That is, a thickness ratio between the skin layer A and the core layer B, which is a value obtained by (thickness of the skin layer A/thickness of the core layer B)*100%, is preferably greater than 1.0% to less than 10.0%.

In the case where the thickness ratio of the skin layer A to the core layer B is equal to or lower than 1.0%, it is not preferable in that the skin layer A is not sufficient to serve as a support layer, such that processing defects such as tearing of a film and the like may be caused during a film stretching process. Further, in the case where the thickness ratio of the skin layer A to the core layer B is equal to or greater than 10.0%, a problem may occur in that the skin layer A, containing no void 1, is too thick to enable sufficient formability during a high-temperature forming process of a reflection film.

The core layer B of the present invention uses homo-polyester as a principal component, and contains copolymer polyester, a resin incompatible with polyester, and inorganic particles.

The skin layer A of the biaxially oriented polyester reflection film 10 uses homo-polyester as a principal component, and contains copolymer polyester and inorganic particles.

The homo-polyester used in the present invention is a polymer obtained by a polycondensation reaction of dicarboxylic acid and diol components. The dicarboxylic acid component may be preferably one selected from dimethyl terephthalate, terephthalic acid, isophthalic acid, 2,6-naphthalene dicarboxylic acid, sebacic acid, adipic acid, diphenyl dicarboxylic acid, 5-tert-butylisophthalic acid, 2,2,6,6-tetramethyl-diphenyl-4,4-dicarboxylic acid, 1,1,3-trimethyl-3-phenylphosphate-4,5-dicarboxylic acid, 5-sodium sulfoisophthalic acid, trimellitic acid, oxalic acid, malonic acid, succinic acid, glutaric acid, pimelic acid, azelaic acid, pyromellitic acid, 1,4-cyclohexanedicarboxylic acid, 1,3-cyclohexanedicarboxylic acid, and the like, and more preferably one selected from dimethyl terephthalate and terephthalic acid. The diol component may be preferably one selected from ethylene glycol, trimethylene glycol, tetramethylene glycol, 2,2-dimethyl(1,3-propane)diol, 1,4-cyclohexanedimethanol, and the like, and more preferably ethylene glycol.

The copolymer polyester used in the present invention is a polymer obtained by a polycondensation reaction of two or more of dicarboxylic acid components or diol components among the homo-polyester. As the dicarboxylic acid component, it is preferable to use terephthalic acid in combination with isophthalic acid, 2 6-naphthalene dicarboxylic acid, and the like, and as the diol component, it is preferable to use ethylene glycol in combination with 2,2-dimethyl(1,3-propane)diol, 1,4-cyclohexanedimethanol, and the like.

The resin incompatible with polyester, which is used in the present invention, may be preferably a homo-polymer or a copolymer of one or more selected from a crystalline polyolefin resin, a non-crystalline cyclic polyolefin resin, a polystyrene resin, a polyacrylate resin, a polycarbonate resin, a polyacrylonitrile resin, a polyphenylene sulfide resin, and a fluorine-based resin, and more preferably a non-crystalline cyclic polyolefin resin.

The inorganic particles used in the present invention may be preferably one or more selected from a group consisting of silica, alumina, barium sulfate, titanium dioxide, calcium carbonate, and the like, and more preferably calcium carbonate particles.

The size of the inorganic particles used in the core layer B, among the inorganic particles, is preferably greater than 0.01 um to smaller than 2.0 um, and more preferably greater than 0.1 um to smaller than 1.0 um. In the case where the size of the inorganic particles used in the core layer B is equal to or greater than 2.0 um, the Mie scattering effect at the particle interface is significantly reduced, thereby deteriorating reflective properties. When press forming or vacuum pressure forming of the produced biaxially oriented polyester reflection film is performed at high temperature, the voids 1 of the biaxially oriented polyester reflection film are deformed due to high-temperature heat and pressure, but in the case where the size of the inorganic particles used in the core layer B is equal to or smaller than 0.01 um, the inorganic particles may not serve as a support layer that minimizes deformation of the voids 1 in the film, and thus the reflective properties are significantly deteriorated after forming.

The size of the inorganic particles used in the skin layer A, among the inorganic particles, is preferably greater than 0.1 um to smaller than 10.0 um, and more preferably greater than 1.0 um to smaller than 5.0 um. In the case where the size of the inorganic particles used in the skin layer A is equal to or smaller than 0.1 um, a film traveling performance is significantly degraded during a film production process, thereby causing many scratches on the film surface; and in the case where the size of the inorganic particles is equal to or greater than 10.0 um, the inorganic particles are not appropriate, since large particles may cause processing defects, such as tearing of a film, during a film stretching process of the film production process.

The core layer B of the present invention uses homo-polyester as a principal component, and contains copolymer polyester, a resin incompatible with polyester, and inorganic particles, in which the core layer B satisfies the following Equation 1 in order to have excellent reflective and thermal properties after forming at high temperature.

$$0.05 \leq \frac{V_d}{(Va + Vb) - Vc} \leq 0.2 \qquad \text{[Equation 1]}$$

In Equation 1, Va denotes the percentage by volume of the homo-polyester, Vb denotes the percentage by volume of the copolymer polyester, Vc denotes the percentage by volume of the incompatible resin, and Vd denotes the percentage by volume of the inorganic particles. In Equation 1, the denominator denotes a volume percentage content obtained by subtracting the percentage by volume of the incompatible resin from the total percentage by volume of the homo-polyester resin and the copolymer polyester resin of the core layer B.

In the case where the value of Equation 1 is greater than 0.2, an excessive amount of inorganic particles are contained in the core layer B, such that stretchability is significantly reduced, thereby causing processing defects such as tearing of the film; and the excessive amount of inorganic particles accelerates crystallization of the biaxially oriented polyester reflection film, thereby significantly reducing formability. Further, in the case where the value of Equation 1 is smaller than 0.05, a small amount of inorganic particles are contained in the core layer B, such that the reflective properties are significantly deteriorated after forming at high temperature. The reason that optical characteristics are deteriorated after forming is that when press forming or the vacuum pressure forming is performed at high temperature, the voids 1 of the biaxially oriented polyester reflection film are deformed due to high-temperature heat and pressure, and the inorganic particles serve as a support layer that minimizes deformation of the voids in the film.

Further, the percentage by volume of the incompatible resin of the denominator is preferably in a range of from 5.0% by volume to 20.0% by volume. In the case where a content of the incompatible resin is less than 5.0% by volume, the amount of voids 1 in the film is reduced, such that the reflective properties are significantly deteriorated; and in the case where the percentage by volume of the incompatible resin is greater than 20% by volume, many voids are formed in the film, which is advantageous for reflective properties, but may cause a problem in that film producing properties are significantly deteriorated, such that productivity may be sharply reduced.

The percentage by volume of the copolymer polyester resin in the denominator is preferably in a range of from 5% by volume to 30% by volume. In the case where a content of the copolymer polyester is equal to or less than 5.0% by volume, sufficient formability may not be achieved; and in the case where a content of the copolymer polyester is equal to or greater than 30.0% by volume, heat-resistance is reduced, sch that sufficient reflective properties may not be achieved after a forming process is performed at high temperature.

It has been confirmed from many experiments that when contents of the homo-polyester resin, the copolymer polyester resin, the incompatible resin, and the inorganic particles, which are contained in the core layer B of the biaxially oriented polyester reflection film, satisfy the above Equation 1, the biaxially oriented polyester reflection film of the present invention has excellent reflective properties, formability, and film producing stability before and after press forming and vacuum pressure forming are performed at high temperature.

The skin layer A of the present invention uses homo-polyester as a principal component, and contains copolymer polyester and inorganic particles, in which a content of the copolymer polyester is preferably greater than 5.0% by weight to less than 30.0% by weight; and a content of the inorganic particles is preferably greater than 0.1% by weight and less than 10% by weight.

In the case where a content of copolymer polyester in the skin layer A is equal to or less than 5% by weight, sufficient formability of the skin layer may not be achieved; and in the case where a content of copolymer polyester is equal to or greater than 30% by weight, heat-resistance properties in the skin layer are degraded, such that when press forming or vacuum pressure forming is performed, various surface defects may occur on the surface of the film, including portions which are ripped, pressed, and scratched as the film sticks to a mold. Further, in the case where a content of the inorganic particles in the skin layer A is equal to or less than 0.1% by weight, sufficient film traveling performance may not be provided in the film producing process, thereby causing many scratches on the film surface. Further, in the case where a content of the inorganic particles is equal to or greater than 10% by weight, processing defects, such as tearing of the film, may be caused during a film stretching process of the film production process.

A method of producing the biaxially oriented polyester reflection film according to an embodiment of the present invention will be described below.

A first step is a process of drying the above-described raw materials of the skin layer A and the core layer B in each dryer at the temperature of 100° C. to 200° C., in which the drying process is performed under high vacuum for 3 to 10 hours to remove moisture from the resins. The reason for removing moisture in the drying process is to address a problem in that in the case where a polyester resin is hydrolyzed by moisture remaining in the resin during a melt-extrusion process, melt viscosity of polyester is significantly reduced, thereby causing a defect in sheet forming during a T-die extrusion process, or producing foam in the polymer to be discharged, such that a film may not be produced.

A second step is a process of obtaining a non-stretched sheet by melt-extruding the raw materials dried in the first step. In the second step, after melt-extruding the dried materials of the skin layer A and the core layer B by using co-extrusion equipment, including an extruder A' and an extruder B' respectively, at the temperature of 250° C. to 300° C., the resulting materials were introduced into a T-die multiple nozzle. In the T-die multiple nozzle, a three-layer structure A-B-A was formed with the skin layer A being disposed on both surfaces of the core layer B, such that a melted resin was cooled and solidified using a T-die and a casting drum to prepare a non-stretched sheet.

A third step is a process of producing a uniaxially stretched film by stretching the prepared non-stretched sheet in a longitudinal direction, in which it is preferable that the non-stretched sheet was heated by a heating means, such as a roll heater and an infrared heater, at the temperature higher than glass transition temperature of a polyester resin, and then was stretched 3 to 5 times using a difference in travel speeds between two or more rolls.

A fourth step is a process of producing a biaxially stretched film by re-stretching the uniaxially stretched film in a transverse direction, in which after preheating the film, stretched in the longitudinal direction in the third step, within a temperature range of glass transition temperature of the polyester resin +50° C. in an oven having a plurality of preheating zones and stretching zones using oven equipment which stretches the film in a width direction using a travel clip so-called tenter, the resulting film was stretched 3 to 5 times in a transverse direction within the same temperature range.

A fifth step is a process of performing heat treatment for dimensional stability and relaxation of the film stretched in the tenter, in which the stretched film was heat-treated in a plurality of heat-treatment zones formed in the same tenter below a temperature of a melting point of polyester plus 30° C.

In this case, in order to achieve high dimensional stability and forming properties, relaxation of the biaxially stretched film and uniform orientation of the film in a transverse direction are required, which may be achieved by the following processes.

When the heat-treatment process of the film, biaxially stretched in a longitudinal direction and a transverse direction, was performed in the tenter, chains oriented in a longitudinal direction are relaxed, in which a center portion oriented in a width direction may be sufficiently relaxed in the longitudinal direction, but a portion adjacent to the clip may not be relaxed sufficiently in the longitudinal direction due to the clip, such that a bowing phenomenon occurs as the portion is over-oriented in a bow shape in the tenter. In order to solve the problem, it is preferable that a temperature difference between an edge portion of the film stretched in the transverse direction in the fourth step and a starting portion of the heat-treatment in the fifth step is within 30° C.

Further, for relaxation of the film, it is preferable to provide a plurality of heat-treatment zones to increase temperature from a starting zone to an ending zone in a stepwise manner. In addition, it is preferable that a temperature difference between the starting zone and the ending zone of the heat-treatment is in a range of from 30° C. to 100° C.; and the temperature of the ending zone of the heat-treatment is equal to or higher than a melting point temperature of polyester. Moreover, in the case where additional stretching by 0.05 to 0.5 times in the transverse direction is performed in the heat-treatment zone, the bowing phenomenon may be reduced, such that the film may be oriented uniformly in the width direction.

A sixth step is a process of slowly cooling the biaxially oriented film using the plurality of heat-treatment zones in the tenter, in which the cooled film was wound to produce the biaxially oriented polyester reflection film.

A seventh step is a process of forming the reflection film, produced in the sixth step, using a forming mold 200 having a plurality of light focusing structures, each of which has a concave center portion 12, and which are arranged in a grid pattern, so that the reflection film may be formed in the grid pattern of the plurality of concave light focusing structures. By using the light focusing structure, light reflected by the reflection film may be focused onto the center thereof without being scattered in all directions, thereby enabling local dimming of each LED. In this case, the produced biaxially oriented polyester reflection film satisfies an interior angle condition for the film and an interior angle condition for a forming mold illustrated in FIG. 3. The interior angle conditions will be described in detail with reference to the following Equation 2 to be described later.

An eighth step is a process of forming (punching) the hole 13 for mounting the LED in the concave light focusing structures of the reflection film produced in the seventh step. The hole 13 may have various shapes, such as a circular shape, an oval shape, a square shape, and the like, according to the shape of the LED, and a circular shape is preferable.

The biaxially oriented polyester reflection film produced by the above methods have the following properties.

First, the produced biaxially oriented polyester reflection film has a spectral reflectivity which is preferably greater than or equal to 95% at the wavelength of 450 nm. In the case where the spectral reflectivity is less than 95%, sufficient reflection performance may not be achieved, such that luminance (brightness) of a manufactured liquid crystal display may be reduced. Further, in comparison of spectral reflectivity values of the produced reflection film before and after forming in the seventh step, a change in spectral reflectivity at the wavelength of 450 nm before and after forming the reflection film is preferably less than or equal to 5.0%. In the case where the change in spectral reflectivity is greater than 5.0%, sufficient reflection performance may not be achieved, such that luminance (brightness) of a manufactured liquid crystal display may be reduced.

Secondly, formability of the produced biaxially oriented polyester reflection film is evaluated by the following Equation 2, and the produced biaxially oriented polyester reflection film satisfies the equation.

$$\frac{WA_r - WA_m}{WA_r} \times 100\% \leq 5\% \quad \text{[Equation 2]}$$

In Equation 2, WAr denotes an interior angle between a concave portion 12 of the reflection film 10, and a virtual line which connects a convex portion 11, having a maximum height of the reflection film 10 after forming, and a contact point between the reflection film 10 and the forming mold 200; and WAm denotes an interior angle of the forming mold 200. It is preferable that the produced biaxially polyester reflection film satisfies Equation 2 that the relation between the interior angle of the forming mold 200 and the interior angle of the reflection film 10 is equal to or less than 5.0%. In the case where the value of Equation 2 is greater than 5.0%, there is a limitation in reducing the size of the plurality of concave light focusing structures, thereby restricting a plurality of LEDs, provided for improving the efficiency of local dimming, from being mounted therein.

Thirdly, a thickness of the produced biaxially oriented polyester reflection film is preferably in a range of from 150 um to 400 um. In the case where the thickness of the reflection film is less than 150 um, the film is too thin, such that forming processability is significantly reduced, or reflective properties, which have a correlation with thickness, are significantly degraded. In the case where the thickness of the reflection film is greater than 400 um, breakage of the polyester reflection film may frequently occur during a film production process, such that the production process may not be performed stably, and a greater thickness results in higher production costs. Further, in this case, a total thickness of the produced liquid crystal display is increased, making it difficult to design the display with a slim design.

Fourthly, a specific gravity of the produced biaxially oriented polyester reflection film is preferably in a range of from 0.7 g/cm³ to 1.2 g/cm³. In the case where the specific gravity of the reflection film is less than 0.7 g/cm³, breakage of the polyester reflection film may frequently occur during a film production process, such that the production process may not be performed stably, and dimensional stability is significantly reduced due to heat treatment during a forming process. In the case where the specific gravity of the reflection film is greater than 1.2 g/cm³, production costs are increased, and sufficient voids 1 may not be formed in the core layer of the polyester reflection film, such that reflective properties may be significantly degraded.

Lastly, a dimensional change rate of the produced biaxially oriented polyester reflection film is preferably less than or equal to 5% after being left for 500 hours under constant temperature at 60° C. and constant humidity at 90%. In the case where the dimensional change rate is greater than 5%, the position of the hole 13 may be changed, or the LEDs mounted in the plurality of concave light focusing structures may be separated.

Hereinafter, the configuration and effects of the present invention will be described in further detail with reference to Examples and Comparative Examples. However, it should be understood that these examples are provided for more specific illustration of the present invention and are not to be construed as limiting the scope of the present invention.

EXAMPLES

Example 1

In the reflection film, the skin layer A is formed on both surfaces of the core layer B, in which the layers are laminated in the order the skin layer A, the core layer B, and the skin layer A. The skin layer A consists of 88% by weight of polyethylene terephthalate (A9093 manufactured by Toray Advanced Materials Korea Inc.) as homo-polyester, 10% by weight of copolymer polyester (GN071 manufactured by Eastman Chemical Company), and 2% by weight of silica particles having an average particle diameter of 2.0 um as inorganic particles; and the core layer B consists of 77% by volume of polyethylene terephthalate (A9093 manufactured by Toray Advanced Materials Korea Inc.) as homo-polyester, 11% by volume of copolymer polyester (GN071 manufactured by Eastman Chemical Company), 7% by volume of an ethylene-norbornene copolymer resin, which is a non-crystalline cyclic olefin copolymer, as an incompatible resin, and 5% by volume of calcium carbonate particles having an average particle diameter of 0.6 um as inorganic particles. Then, the skin layer and the core layer B were co-extruded in the extruder A' and the extruder B' respectively at 280° C. to form A-B-A layers, and were cooled and solidified using a T-die and a casting drum to prepare a non-stretched sheet. Next, the non-stretched sheet was biaxially stretched 3.2 times in a longitudinal direction and 3.6 times in a transverse direction by the above film producing method, to produce the reflection film. Then, the biaxially oriented polyester reflection film was produced by forming using a forming mold having a width of 200 mm and a length of 300 mm as illustrated in FIG. 1. In this case, the biaxially oriented polyester reflection film was produced by preprocessing at a heating temperature of 180° C. for 8 seconds using a compact vacuum-pressure forming machine (FKS-0632-20) manufactured by Asano Laboratories Co., Ltd., followed by vacuum-pressure forming to produce a biaxially oriented polyester reflection film formed in the same shape as the forming mold.

Example 2

A biaxially oriented polyester reflection film was produced in the same manner as Example 1, except that the content of the inorganic particles in the core layer B was changed from 5% by volume to 11% by volume.

Example 3

A biaxially oriented polyester reflection film was produced in the same manner as Example 1, except that the content of the incompatible resin in the core layer B was changed from 7% by volume to 14% by volume.

Example 4

A biaxially oriented polyester reflection film was produced in the same manner as Example 1, except that the content of the copolymer polyester resin in the core layer B was changed from 11% by volume to 22% by volume.

Comparative Example 1

A biaxially oriented polyester reflection film was produced in the same manner as Example 3, except that the content of the inorganic particles in the core layer B was changed from 5% by volume to 2% by volume.

Comparative Example 2

A biaxially oriented polyester reflection film was produced in the same manner as Example 3, except that the content of the inorganic particles in the core layer B was changed from 5% by volume to 25% by volume.

Comparative Example 3

A biaxially oriented polyester reflection film was produced in the same manner as Example 1, except that the content of the incompatible resin in the core layer B was changed from 7% by volume to 3% by volume.

Comparative Example 4

A biaxially oriented polyester reflection film was produced in the same manner as Example 1, except that the content of the incompatible resin in the core layer B was changed from 7% by volume to 27% by volume.

Comparative Example 5

A biaxially oriented polyester reflection film was produced in the same manner as Example 1, except that the content of the copolymer polyester resin in the core layer B was changed from 11% by volume to 3% by volume.

Comparative Example 6

A biaxially oriented polyester reflection film was produced in the same manner as Example 1, except that the content of the copolymer polyester resin in the core layer B was changed from 11% by volume to 37% by volume.

Comparative Example 7

A biaxially oriented polyester reflection film was produced in the same manner as Example 1, except that the content of the copolymer polyester resin in the skin layer A was changed from 10% by volume to 3% by volume.

Comparative Example 8

A biaxially oriented polyester reflection film was produced in the same manner as Example 1, except that the content of the copolymer polyester resin in the skin layer A was changed from 10% by volume to 35% by volume.

Comparative Example 9

A biaxially oriented polyester reflection film was produced in the same manner as Example 1, except that a thickness ratio between the skin layer A and the core layer B was changed to 0.8%.

Comparative Example 10

A biaxially oriented polyester reflection film was produced in the same manner as Example 1, except that a thickness ratio between the skin layer A and the core layer B was changed to 12.5%.

Compositions of the skin layer A and the core layer B in the above Examples 1 to 4 and Comparative Examples 1 to 10 are shown in Tables 1 and 2 below.

TABLE 1

Composition of skin layer A

| Experimental example | Composition of skin layer (wt %) | | |
|---|---|---|---|
| | Homo-polyester | Copolymer polyester | Inorganic particle |
| Example 1 | 88 | 10 | 2 |
| Example 2 | 88 | 10 | 2 |
| Example 3 | 88 | 10 | 2 |
| Example 4 | 88 | 10 | 2 |
| Comparative Example 1 | 88 | 10 | 2 |
| Comparative Example 2 | 88 | 10 | 2 |
| Comparative Example 3 | 88 | 10 | 2 |
| Comparative Example 4 | 88 | 10 | 2 |
| Comparative Example 5 | 88 | 10 | 2 |
| Comparative Example 6 | 88 | 10 | 2 |
| Comparative Example 7 | 95 | 3 | 2 |
| Comparative Example 8 | 63 | 35 | 2 |
| Comparative Example 9 | 88 | 10 | 2 |
| Comparative Example 10 | 88 | 10 | 2 |

TABLE 2

Composition of core layer B

| | Composition of core layer B (volume %) | | | | | | | | | | | |
|---|---|---|---|---|---|---|---|---|---|---|---|---|
| | Homo-polyester | | | Copolymer polyester | | | Incompatible resin | | | Inorganic particle | | |
| | wt % | Specific gravity | Volume % | wt % | Specific gravity | Volume % | wt % | Specific gravity | Volume % | wt % | Specific gravity | Volume % |
| Ex. 1 | 75 | 1.4 | 77 | 10 | 1.32 | 11 | 5 | 1.02 | 7 | 10 | 2.71 | 5 |
| Ex. 2 | 66 | 1.4 | 71 | 10 | 1.32 | 11 | 5 | 1.02 | 7 | 19 | 2.71 | 11 |
| Ex. 3 | 70 | 1.4 | 70 | 10 | 1.32 | 11 | 10 | 1.02 | 14 | 10 | 2.71 | 5 |
| Ex. 4 | 65 | 1.4 | 66 | 20 | 1.32 | 22 | 5 | 1.02 | 7 | 10 | 2.71 | 5 |
| Comp. ex. 1 | 77 | 1.4 | 75 | 10 | 1.32 | 10 | 10 | 1.02 | 13 | 3 | 2.71 | 2 |

TABLE 2-continued

Composition of core layer B

Composition of core layer B (volume %)

| | Homo-polyester | | | Copolymer polyester | | | Incompatible resin | | | Inorganic particle | | |
|---|---|---|---|---|---|---|---|---|---|---|---|---|
| | wt % | Specific gravity | Volume % | wt % | Specific gravity | Volume % | wt % | Specific gravity | Volume % | wt % | Specific gravity | Volume % |
| Comp. ex. 2 | 55 | 1.4 | 60 | 10 | 1.32 | 11 | 10 | 1.02 | 15 | 25 | 2.71 | 14 |
| Comp. ex. 3 | 78 | 1.4 | 81 | 10 | 1.32 | 11 | 2 | 1.02 | 3 | 10 | 2.71 | 5 |
| Comp. ex. 4 | 60 | 1.4 | 58 | 10 | 1.32 | 10 | 20 | 1.02 | 27 | 10 | 2.71 | 5 |
| Comp. ex. 5 | 82 | 1.4 | 84 | 3 | 1.32 | 3 | 5 | 1.02 | 7 | 10 | 2.71 | 5 |
| Comp. ex. 6 | 50 | 1.4 | 50 | 35 | 1.32 | 37 | 5 | 1.02 | 7 | 10 | 2.71 | 5 |
| Comp. ex. 7 | 75 | 1.4 | 77 | 10 | 1.32 | 11 | 5 | 1.02 | 7 | 10 | 2.71 | 5 |
| Comp. ex. 8 | 75 | 1.4 | 77 | 10 | 1.32 | 11 | 5 | 1.02 | 7 | 10 | 2.71 | 5 |
| Comp. ex. 9 | 75 | 1.4 | 77 | 10 | 1.32 | 11 | 5 | 1.02 | 7 | 10 | 2.71 | 5 |
| Comp. ex. 10 | 75 | 1.4 | 77 | 10 | 1.32 | 11 | 5 | 1.02 | 7 | 10 | 2.71 | 5 |

With respect to the above Examples 1 to 4 and Comparative Examples 1 to 10 as shown in the above Tables 1 and 2, the physical properties of the film were measured and evaluated based on the following Experimental Examples.

Experimental Examples (1) Measurement of Thickness

A thickness of the produced biaxially oriented polyester reflection film was evaluated according to JIS C2151-2006 of the Japanese Standards Association, which is a testing method of plastic films for electrical purposes. A fragment sample was obtained by cutting the biaxially oriented polyester reflection film of the present invention in a thickness direction using a microtome. Then, the thickness of the skin layer A and the thickness of the core layer B were measured from a cross-section image of the cut film that was enlarged 250 times using a transmission electron microscope S-800 manufactured by Hitachi Seisakusho, Ltd.

(2) Measurement of Spectral Reflectivity

By attaching an integrating sphere to a spectrophotometer (U3310) manufactured by Hitachi High Technologies, and reflectivity of the produced biaxially oriented polyester reflection film was measured at a wavelength of 450 nm based on a total of 100% of a white standard plate (barium sulfate). In this case, reflectivity was measured both before and after forming performed using the forming mold in the seventh step.

(3) Measurement of Interior Angle

The shape and dimension of the produced biaxially oriented polyester reflection film was measured by using Keyence 3D optical profiler VR-3200.

(4) Measurement of Specific Gravity

After cutting the produced biaxially oriented polyester reflection film to a size of 10 cm×10 cm, the weight of the film was accurately measured down to 0.1 mg using an electronic scale (AC100 manufactured by Mettler Toledo). Then, an average value was obtained by measuring a ten point thickness of the measured sample using a constant pressure thickness gauge, and the specific gravity was calculated using the following Equation 3.

$$[\text{Film weight }(g)/\text{Film thickness }(um)]\times 100 \qquad [\text{Equation 3}]$$

(5) Measurement of Dimensional Change after Forming

Before and after the produced biaxially oriented polyester reflection film was left under constant temperature at 60° C. and constant humidity at 90% for 500 hours, a length L between maximum heights of the formed reflection plate was measured from the convex portion 11 of the reflection film of FIG. 3, which has a maximum height, using Keyence 3D optical profiler VR-3200, and then a dimensional change of the produced biaxially oriented polyester reflection film was obtained based on the measurement.

(6) Film Producing Stability Test

The film producing stability was determined based on criteria shown in Table 3 below.

TABLE 3

| Classification symbol | Criteria for determination |
|---|---|
| O | Film was produced stably without film breakage for over 24 hours |
| Δ | Film breakage occurred within a time period of 6 to 24 hours |
| X | Film breakage occurred within 6 hours |

Results of 6 experiments conducted for the biaxially oriented polyester reflection film based on the above Experimental Examples are shown in Table 4.

TABLE 4

Results of experiments

| | A/B/A film thickness | | | | | | Reflectivity at 450 nm (%) | | | | Dimension | |
| --- | --- | --- | --- | --- | --- | --- | --- | --- | --- | --- | --- | --- |
| | Skin thickness | Core thickness | Total thickness | Thickness ratio | Equation 1 | Equation 2 | Before forming | After forming | difference | Specific gravity (g/cm³) | Change after forming | Film producing stability |
| Ex. 1 | 10 | 230 | 250 | 4.3 | 0.07 | 2 | 100.1 | 99.8 | 0.3 | 0.90 | 1 | O |
| Ex. 2 | 15 | 240 | 270 | 6.3 | 0.14 | 2 | 100.5 | 100.1 | 0.4 | 0.95 | 1 | O |
| Ex. 3 | 7 | 205 | 219 | 3.4 | 0.08 | 2 | 100.6 | 99.9 | 0.7 | 0.82 | 1 | O |
| Ex. 4 | 5 | 188 | 198 | 2.7 | 0.07 | 1 | 100.0 | 99.4 | 0.6 | 0.89 | 3 | O |
| Comp. ex. 1 | 7 | 200 | 214 | 3.5 | 0.02 | 3 | 99.7 | 90.1 | 9.6 | 0.85 | 4 | Δ |
| Comp. ex. 2 | 7 | 210 | 224 | 3.3 | 0.25 | 5 | 100.8 | 100.7 | 0.1 | 1.05 | 1 | X |
| Comp. ex. 3 | 10 | 200 | 220 | 5.0 | 0.06 | 4 | 95.3 | 89.2 | 6.1 | 1.25 | 3 | Δ |
| Comp. ex. 4 | 10 | 260 | 280 | 3.8 | 0.12 | 2 | 100.8 | 97.6 | 3.2 | 0.65 | 5 | X |
| Comp. ex. 5 | 9 | 234 | 252 | 3.8 | 0.07 | 15 | 99.7 | 97.6 | 2.1 | 0.88 | 1 | X |
| Comp. ex. 6 | 11 | 215 | 237 | 5.1 | 0.06 | 1 | 95.2 | 81.6 | 13.6 | 0.97 | 16 | Δ |
| Comp. ex. 7 | 9 | 227 | 245 | 4.0 | 0.07 | 9 | 99.7 | 99.2 | 0.5 | 0.91 | 3 | X |
| Comp. ex. 8 | 10 | 255 | 275 | 3.9 | 0.07 | 1 | 99.3 | 97.7 | 1.6 | 0.89 | 9 | Δ |
| Comp. ex. 9 | 2 | 246 | 250 | 0.8 | 0.07 | 1 | 100.3 | 100.0 | 0.3 | 0.87 | 1 | X |
| Comp. ex. 10 | 25 | 200 | 250 | 12.5 | 0.07 | 25 | 95.6 | 94.5 | 1.1 | 1.16 | 4 | O |

As shown in Table 4 above, it can be confirmed that the biaxially oriented polyester reflection film produced in Examples 1 to 4 have excellent formability before and after foming, reflective properties, dimensional stability, and film producing stability.

With respect to Comparative Example 1, the value of Equation 1, which represents a condition for the volume percentage of composition materials in the core layer B, is 0.02, such that the value does not satisfy a range condition of 0.05 or higher. This shows that a small amount of the inorganic particles are contained, such that after forming at high temperature, reflective properties are sharply reduced. Further, based on Comparative Example 1 showing that spectral reflectivity after forming is 90.1%, and a difference in spectral reflectivity values before and after forming is 9.6%, it can be seen that during a process of forming the film in a grid pattern of the concave light focusing structures using the forming mold, reflectivity is significantly reduced, such that sufficient reflection performance may not be achieved, and luminance of the produced display may be reduced. Further, in the film producing stability test, Comparative Example 1 shows that film breakage occurred within a time period of 6 to 24 hours.

With respect to Comparative Example 2, the value of Equation 1 is 0.25, which is higher than a range condition of 0.2. This shows that an excessive amount of the inorganic particles are contained in the core layer B, such that during a film producing process, stretchability is significantly reduced, thereby casing processing defects such as tearing of film, and the like. The excessive amount of inorganic particles accelerates crystallization of the biaxially oriented polyester reflection film, such that formability is sharply degraded. As a result, in the film producing stability test, Comparative Example 2 shows that film breakage occurred within 6 hours.

With respect to Comparative Example 3, the content of the incompatible resin in the core layer B is 3% by volume, which thus does not satisfy the condition of 5% by volume or higher. Further, in Comparative Example 3 spectral reflectivity after forming is 89.2%, and a difference in spectral reflectivity values before and after forming is 6.1%, which does not satisfy a condition for the spectral reflectivity difference being 5% or less, such that during a process of forming the film in a grid pattern of the concave light focusing structures using the forming mold, reflectivity is significantly reduced. Further, in Comparative Example 3, a specific gravity value is 1.25, which does not satisfy a condition of 1.2 or less, such that production costs are increased, and a sufficient number of voids 1 may not be formed in the core layer of the polyester reflection film, thereby significantly reducing reflective properties. In addition, in the film producing stability test, Comparative Example 3 shows that film breakage occurred within a time period of 6 to 24 hours.

With respect to Comparative Example 4, the content of the incompatible resin in the core layer B is 27% by volume, which does not satisfy the condition of 20% by volume or less. This shows that an excessive number of voids 1 were formed in the reflection film, thereby reducing film producing properties. Accordingly, in Comparative Example 4, a specific gravity value is 0.65, which does not satisfy a condition of 0.7 or higher, and in the film producing stability test, film breakage occurred within 6 hours.

With respect to Comparative Example 5, the content of the copolymer polyester resin in the core layer B is 3% by volume, which does not satisfy the condition of 5% by volume or higher. Further, in Comparative Example 5, a value of Equation 2, which represents a relation between the interior angle of the forming mold and the interior angle of the reflection film after forming, is 15%, and thus does not satisfy a condition of 5% or less. Accordingly, there is a limitation in reducing the size of the plurality of concave light focusing structures in the formed reflection film, thereby restricting a plurality of LEDs, provided for improving the efficiency of local dimming, from being mounted therein. In addition, in the film producing stability test, Comparative Example 5 shows that film breakage occurred within 6 hours.

With respect to Comparative Example 6, the content of the copolymer polyester resin in the core layer B is 37% by volume, which does not satisfy the condition of 30% by volume or less. Further, in Comparative Example 6, spectral reflectivity after forming is 81.6%, and a difference in reflectivity values before and after forming is 13.6%, such that during a process of forming the film in a grid pattern of the concave light focusing structures using the forming mold, reflectivity is significantly reduced. In addition, in Comparative Example 6, a dimensional change after forming is 16%, which does not satisfy a condition of 5% or less. As a result, due to a substantial change in dimension, the position of the hole 13 may be changed or the mounted LED may be separated, and in the film producing stability test, Comparative Example 6 shows that film breakage occurred within a time period of 6 to 24 hours.

With respect to Comparative Example 7, the content of the copolymer polyester resin in the skin layer A is 3% by weight, which does not satisfy the condition of higher than 5% by weight. Further, in Comparative Example 7, a value of Equation 2, which represents a relation between the interior angle of the forming mold and the interior angle of the reflection film after forming, is 9%, and thus does not satisfy a condition of 5% or less. Accordingly, in the film producing stability test, Comparative Example 7 shows that film breakage occurred within 6 hours.

With respect to Comparative Example 8, the content of the copolymer polyester resin in the skin layer A is 35% by weight, thus does not satisfy the condition of less than 30% by weight. Further, in Comparative Example 8, a dimensional change after forming is 9%, which does not satisfy a condition of 5% or less. As a result, due to a substantial change in dimension, the position of the hole 13 may be changed or the mounted LED may be separated. In addition, in the film producing stability test, Comparative Example 8 shows that film breakage occurred within a time period of 6 to 24 hours.

With respect to Comparative Example 9, a thickness ratio between the skin layer A and the core layer B is 0.8, which does not satisfy the condition of higher than 1.0%. Accordingly, in the film producing stability test, Comparative Example 9 shows that film breakage occurred within 6 hours.

With respect to Comparative Example 10, a thickness ratio between the skin layer A and the core layer B is 12.5%, which does not satisfy the requirement of greater than 1.0% and less than 10.0%. Further, in Comparative Example 10, a value of Equation 2, which represents a relation between the interior angle of the forming mold and the interior angle of the reflection film after forming, is 25%, and thus does not satisfy a condition of 5% or less. Accordingly, there is a limitation in reducing the size of the plurality of concave light focusing structures in the formed reflection film, thereby restricting a plurality of LEDs, provided for improving the efficiency of local dimming, from being mounted therein. In addition, in Comparative Example 10, reflectivity after forming is 94.5%, and thus does not satisfy the condition of 95% or higher.

As described above, in the biaxially oriented polyester reflection film and the method of producing the same according to an embodiment of the present invention, the reflection film may maintain superior dimensional stability and reflective properties even after forming, by using a multi-layer structure of the reflection film, reforming raw materials, adjusting a volume proportion of the incompatible resin and inorganic particles, providing a production method for relaxation, and the like. Accordingly, the reflection film may also be used as a reflection film for local dimming.

While only several of various embodiments, performed by the inventors of the present invention, have been shown and described, the technical spirit of the present invention is not restricted or limited by these embodiments, and it should be understood that the present invention may be modified and implemented in various ways by those skilled in the art.

[Explanation of Reference Numerals and Symbols]

10: Biaxially Oriented Polyester Reflection Film
A: Skin Layer  B: Core Layer
1: Void
11: Convex Portion  12: Concave Portion
13: Hole
200: Forming Mold

The invention claimed is:

1. A biaxially oriented polyester reflection film, comprising:
a core layer having a plurality of voids, and containing homo-polyester, copolymer polyester, a resin incompatible with polyester, and inorganic particles; and
a skin layer formed at least one surface of the core layer, and containing homo-polyester, copolymer polyester, and inorganic particles,
wherein the biaxially oriented polyester reflection film comprises a plurality of light focusing structures, each light focusing structure having a concave center portion in which a hole is formed, and
wherein the plurality of light focusing structures are arranged in a grid pattern so that a convex portion and the concave center portion are repeatedly formed in the reflection film.

2. The reflection film of claim 1, wherein a thickness of the skin layer is greater than 1.0% to less than 10.0% of a thickness of the core layer.

3. The reflection film of claim 1, wherein a size of the inorganic particles of the core layer is greater than 0.01 um to less than 2.0 um.

4. The reflection film of claim 1, wherein a size of the inorganic particles of the skin layer is greater than 0.1 um to less than 10.0 um.

5. The reflection film of claim 1, wherein the core layer satisfies an equation $$0.05 \le \frac{V_d}{(Va + Vb) - Vc} \le 0.2,$$

and
wherein Va denotes a percentage by volume of the homo-polyester, Vb denotes a percentage by volume of the copolymer polyester, Vc denotes a percentage by volume of the incompatible resin, and Vd denotes a percentage by volume of the inorganic particles.

6. The reflection film of claim 5, wherein a content of the incompatible resin is in a range of from 5.0% by volume to 20.0% by volume, and a content of the copolymer polyester is in a range of from 5.0% by volume to 30.0% by volume.

7. The reflection film of claim 1, wherein the skin layer contains the copolymer polyester in a range of greater than 5.0% by weight to less than 30.0% by weight, and the inorganic particles in a range of greater than 0.1% by weight to less than 10.0% by weight.

8. The reflection film of claim 1, wherein the biaxially oriented polyester reflection film satisfies an equation $$\frac{WA_r - WA_m}{WA_r} \times 100\% \le 5\%,$$

and
wherein WAm denotes an interior angle of a forming mold used to form the biaxially oriented polyester reflection film in the grid pattern, and WAr denotes an interior angle between a virtual line, which connects the convex portion of the biaxially oriented polyester reflection film and a contact point between the biaxially oriented polyester reflection film and the forming mold, and the concave center portion of the biaxially oriented polyester reflection film.

9. The reflection film of claim 1, wherein the biaxially oriented polyester reflection film has a spectral reflectivity of 95% or higher at a wavelength of 450 nm.

10. The reflection film of claim 8, wherein a change in the spectral reflectivity of the biaxially oriented polyester reflection film is equal to or less than 5.0% at the wavelength of 450 nm before and after forming performed using the forming mold.

11. The reflection film of claim 1, wherein a thickness of the biaxially oriented polyester reflection film is in a range of 150 um to 400 um.

12. The reflection film of claim 1, wherein a specific gravity of the biaxially oriented polyester reflection film is in a range of 0.7 g/cm³ to 1.2 g/cm³.

13. The reflection film of claim 1, wherein a dimensional change rate of the biaxially oriented polyester reflection film is less than or equal to 5% after being left for 500 hours under constant temperature at 60° C. and constant humidity at 90%.

14. The reflection film of claim 1, wherein the resin incompatible with the homo-polyester is at least one selected from a crystalline polyolefin resin, a non-crystalline cyclic polyolefin resin, a polystyrene resin, a polyacrylate resin, a polycarbonate resin, a polyacrylonitrile resin, a polyphenylene sulfide resin, and a fluorine-based resin, or a homopolymer or a copolymer thereof.

15. The reflection film of claim 1, wherein the inorganic particles are one or more selected from the group consisting of silica, alumina, barium sulfate, titanium dioxide, and calcium carbonate.

16. A method of producing a biaxially oriented polyester reflection film, the method comprising:
a first step of drying raw materials of a core layer and a skin layer under vacuum, the raw materials of the core layer comprising homo-polyester, copolymer polyester, a resin incompatible with polyester and inorganic particles and the raw materials of the skin layer comprising homo-polyester, copolymer polyester and inorganic particles;
a second step of preparing a non-stretched sheet by using the raw materials of the core layer and the skin layer which are dried in the first step, to form the skin layer on at least one surface of the core layer;
a third step of producing a uniaxially stretched film by stretching the non-stretched sheet, prepared in the second step, in a longitudinal direction;
a fourth step of producing a biaxially stretched film by re-stretching the uniaxially stretched film, prepared in the third step, in a transverse direction, to produce the biaxially oriented polyester reflection film comprising the core layer having a plurality of voids and the skin layer;
a fifth step of performing heat-treatment of the biaxially oriented polyester reflection film produced in the fourth step;
a sixth step of cooling the biaxially oriented polyester reflection film in the fifth step;
a seventh step of molding the biaxially oriented polyester reflection film, produced in the sixth step, using a forming mold, to form a plurality of light focusing structures, each light focusing structure having a concave center portion and which are arranged in a grid pattern so that a convex portion and the concave center portion are repeatedly formed in the biaxially oriented polyester reflection film; and
an eighth step of forming a hole for mounting an LED in the concave center portion of the plurality of light focusing structures produced in the seventh step.

17. The method of claim 16, wherein the fifth step is performed using a plurality of heat-treatment zones while increasing temperature from a starting zone to an ending zone in a stepwise manner, and
wherein a temperature difference between the starting zone and the ending zone of the heat-treatment is in a range of 30° C. to 100° C.

* * * * *